Figure 1:
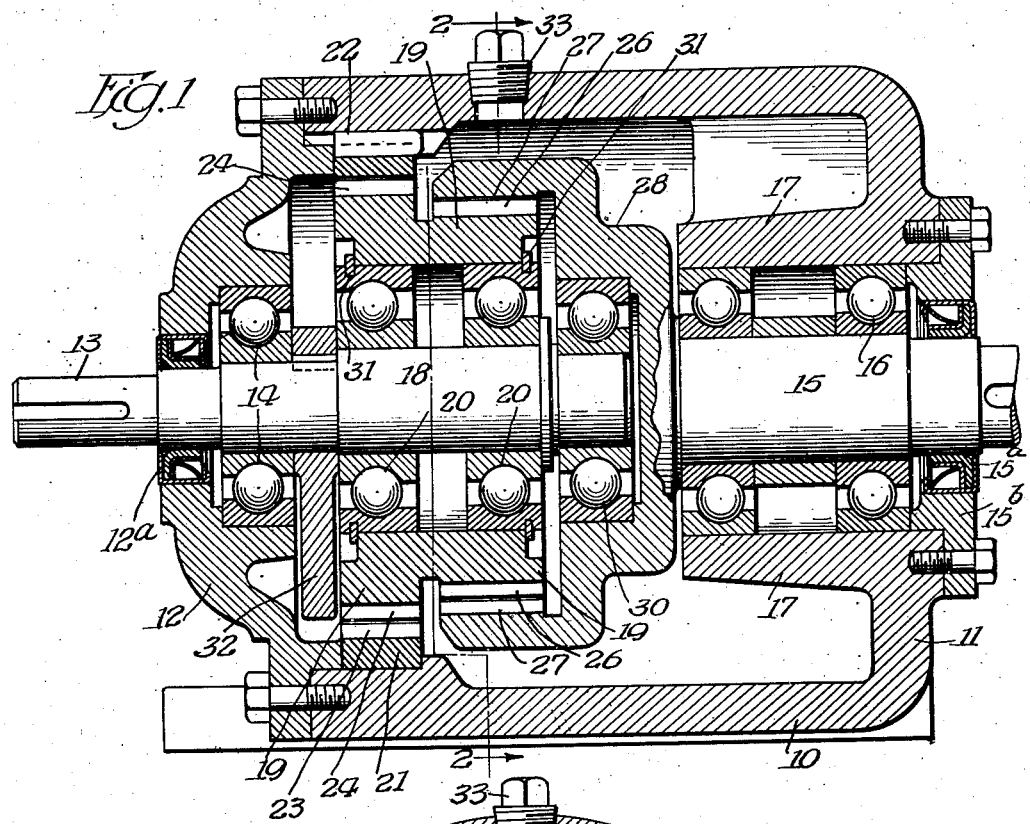

Inventor
Bradford Foote Jr
By Fred Gerlach
his Atty

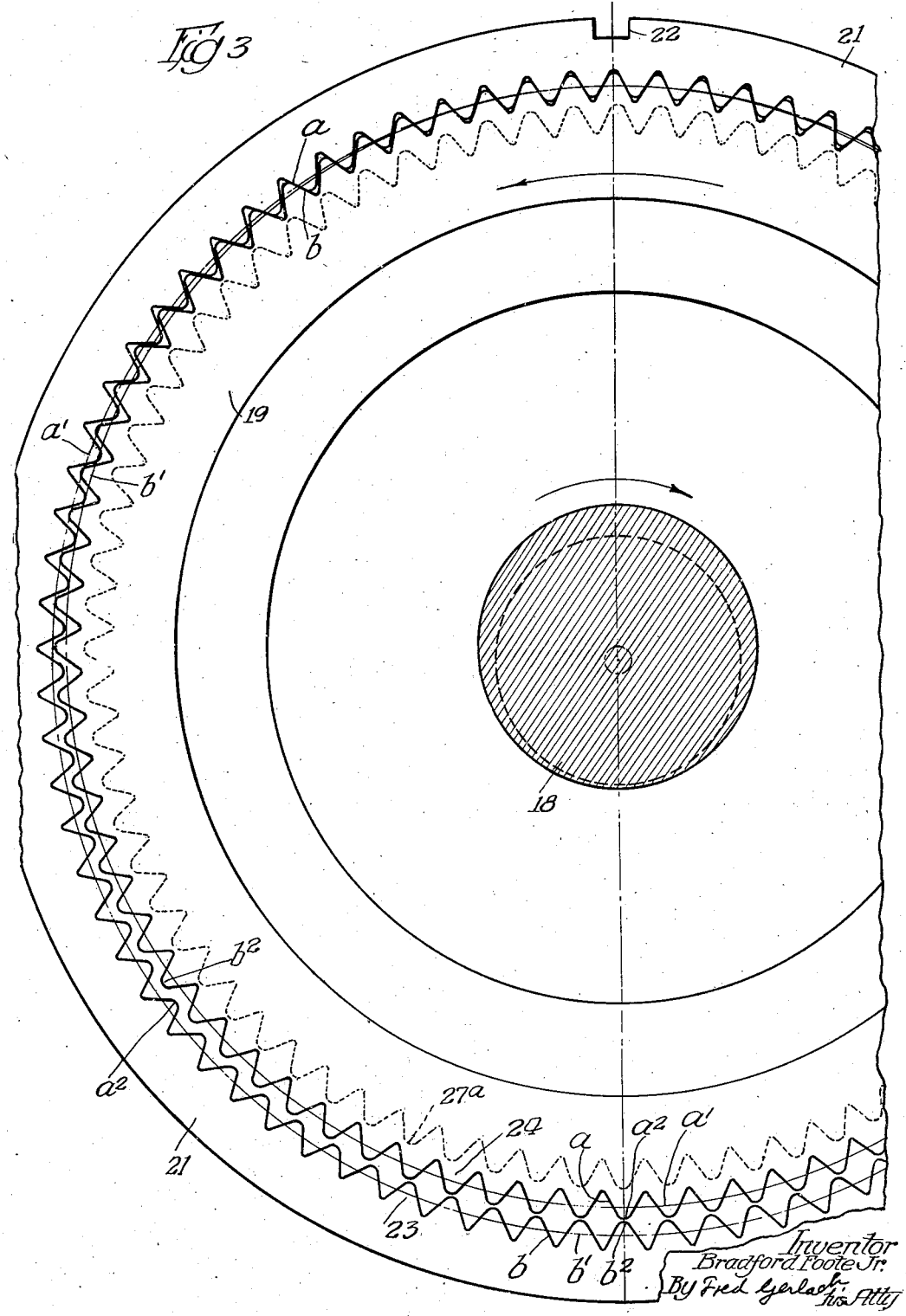

July 22, 1941.　　　B. FOOTE, JR　　　2,250,259
SPEED REDUCING GEARING
Filed March 11, 1940　　　3 Sheets-Sheet 3
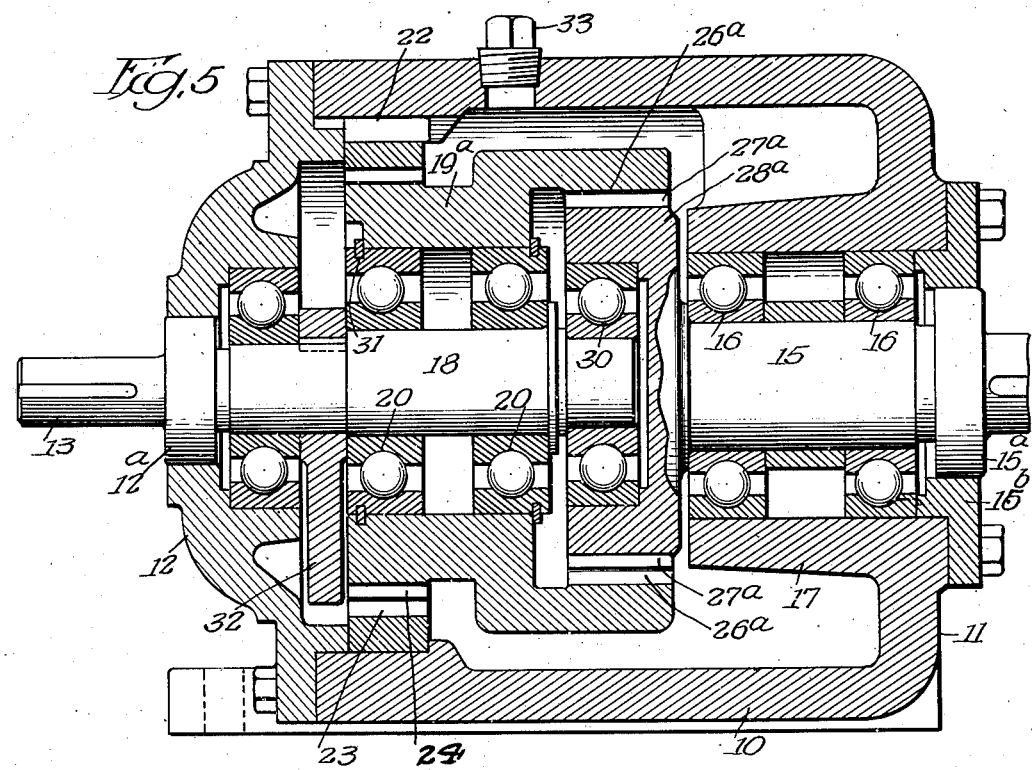
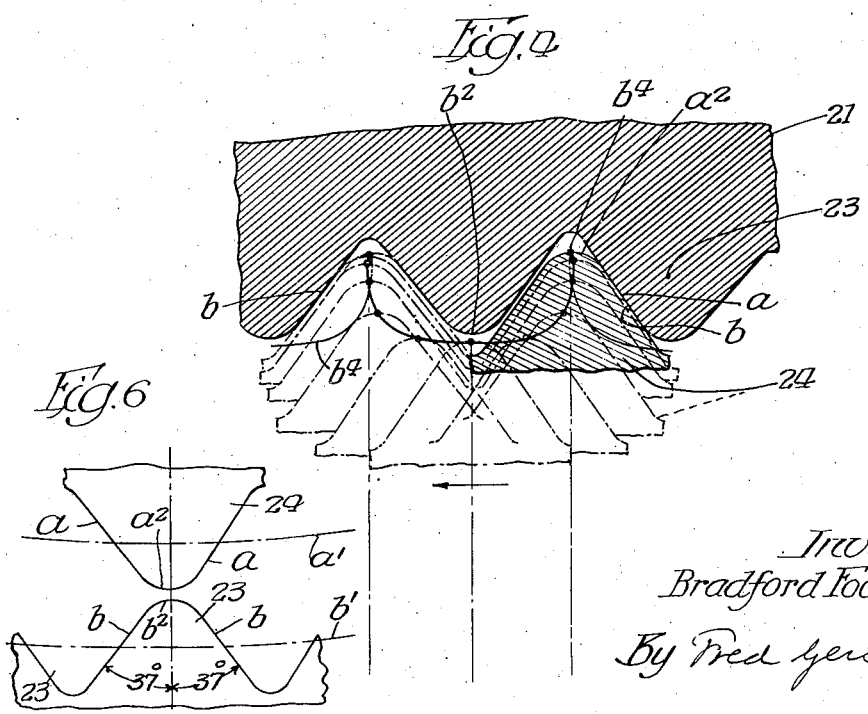
Inventor
Bradford Foote Jr.
By Fred Gerlach
his Atty.

Patented July 22, 1941

2,250,259

UNITED STATES PATENT OFFICE 2,250,259

SPEED REDUCING GEARING

Bradford Foote, Jr., River Forest, Ill.

Application March 11, 1940, Serial No. 323,278

3 Claims. (Cl. 74—309)

The invention relates to helio-centric speed-reducing gearing.

In speed-reducing gearing, a desideratum is to produce a construction of maximum capacity with gears or in a unit as small as possible. Helio-centric gearing lends itself to high ratio or great variation in speed-reduction but, so far as I am aware, has not been extensively adopted for industrial uses on account of the low efficiency or high power losses in prior constructions.

The primary object of the present invention is to provide helio-centric speed-reducing gearing of high efficiency and in which power losses are reduced to the minimum and which is capable of being embodied in a small unit for various industrial uses.

In helio-centric gearing with teeth of standard profiles in internally and externally toothed meshing gears, the minimum difference of five between the number of teeth in the gears has been generally recognized as necessary to provide clearance for the meshing and unmeshing of the teeth. This difference necessitated the movement of the mass in the epicycloidal gear by the eccentric a distance at least as great as the difference between the pitch circles of that gear and the stationary gear and resulted in a loss of power or decreased efficiency proportionate to the radial movement of the mass in the epicycloidal gear. Therefore, a desideratum, for achieving efficiency in eccentric lever gearing, is to reduce the diametric travel of the epicycloidal gear and the throw of the eccentric to the lowest possible minimum. Another object of the invention is to provide a construction of helio-centric gearing in which the radial travel of the epicycloidal gear is held to the lowest minimum necessary for the meshing and unmeshing of the coacting gears during each revolution of the eccentric, so as to eliminate, so far as possible, the power losses resulting from such movement.

Where internally and externally toothed gears having tooth-profiles adapted for line engagement between the meshing teeth, are used in helio-centric gearing, relatively large gears are necessary for high loads or capacities. Another object of the invention is to provide a construction in which the engaging tooth-faces of the gears are substantially straight and parallel during their engagement so that the load will be distributed throughout great areas and so that, during operation, approximately one-sixth of all of the teeth of the gears will be simultaneously engaged wholly or partially for the corresponding distribution of the load. Such a construction makes it possible to provide a comparatively small unit of exceptionally high capacity.

Another object of the invention is to reduce the load imposed on the bearings between the eccentric and the epicycloidal gear and to provide the meshing gears with side-faces which reduce the sliding engagement of the tooth-faces to the practical minimum, by providing the teeth with side-faces, such pitch-angles, and imparting movement to the teeth in such a path that the lines of action will be substantially tangential to the pitch-circles of secondary reduction-gearing and will cause the tooth-faces to be moved parallel-wise to and from each other in the movement of the epicycloidal gear.

Another object of the invention is to provide a gearing in which all of the foregoing advantages and efficiencies are combined to provide a unit of this type which is efficient in operation, is durable, has a high capacity for its size, and overcomes the inefficiencies and power losses of prior constructions.

Other objects of the invention will appear from the detail description.

The invention consists in the several novel features which are hereinafter set forth and are more particularly defined by claims at the conclusion hereof.

Figure 2:
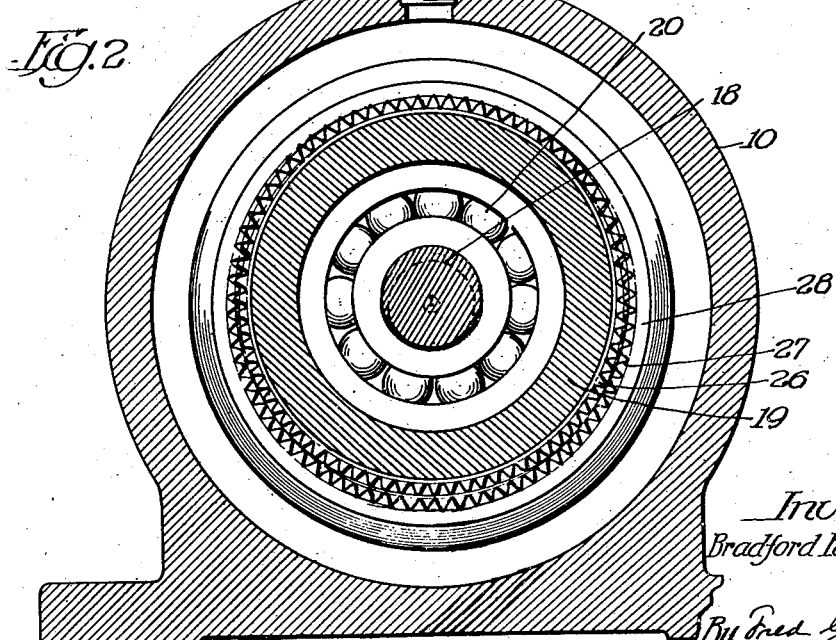

In the drawings: Fig. 1 is a longitudinal section of speed-reducing gearing embodying one form of the invention. Fig. 2 is a vertical section taken on line 2—2 of Fig. 1. Fig. 3 is a view illustrating the tooth-profiles and the movements of the teeth of the epicycloidal gear relatively to the stationary gear and also illustrating in dotted lines the gears of the secondary reduction of Figs. 1 and 2. Fig. 4 is an enlarged diagrammatic view illustrating the path of one of the teeth of the epicycloidal gear in its movement from one tooth to the next of the stationary gear. Fig. 5 is a longitudinal section of a modified form of the invention. Fig. 6 is an enlarged detail of the profiles of the teeth of a coacting pair of gears.

The unit illustrated in Figs. 1 and 2, as an exemplification of the invention, comprises a case which encloses the gearing and is provided with a suitable base, an annular wall 10, and an integral wall 11 at one of its ends and a removable head 12 at its opposite end. The speed reducing gearing is insertable into and removable from the case through the open end which is closed by the head 12. A high speed or in-put shaft 13 is journaled in a ball-bearing 14 which is mounted in the head 12. A low speed or output shaft 15 is coaxial with shaft 14 and is journaled in ball-bearings 16 which are carried by an inwardly extending cylindrical member 17 which is integral with the end wall 11. An eccentric 18 for driving the gearing between shafts 13 and 15 is integrally formed on shaft 13. The case 10 is adapted to contain oil for lubricating all of the parts within the case and is provided with a plug 33 for delivering oil into the case.

A ring 19 is journaled on ball-bearings 20 which extend around and are mounted on the eccentric 18, so that the ring is rotatable around the axis of, and movable radially by, eccentric 18. A ring 21 is fixedly secured, by a key 22, against rotation in gear-case 10. Ring 21 is provided with internal gear-teeth forming a gear 23 having a pitch-circle concentric with the axis of shaft 13. Ring 19 is provided with external teeth which form a gear 24 which meshes with gear 23 and has a pitch-circle which is concentric with the eccentric 18. Gear 23 and eccentric 18, upon rotation of the latter by and with shaft 13, produce epicycloidal movement of gear 24 and ring 19. These internally and externally toothed-gears and eccentric function as a primary speed-reduction of the heliocentric type.

Ring 19 is held against endwise movement relatively to the eccentric 18 by locking-rings 31 which interfit with the outer races of ball-bearings 20. A counterbalance 32 is keyed to shaft 13 between eccentric 18 and ball 14. An oil-seal ring 12ª is provided around in-put shaft 13 and carried by the head 12 and a similar oil-seal ring 15ª around out-put shaft 15 is carried by a cap 15ᵇ which is secured to the end-wall 11 of case 10.

An externally-toothed gear 26 concentric with gear 24, is cut on ring 19. Gear 26 meshes with an internally-toothed gear 27 on a wheel 28 which is rigid or integral with the out-put shaft 15. The inner end of the in-put shaft 13 is journaled in a ball-bearing 30 which is mounted in wheel 28. Gear 26 travels epicycloidally with gear 24 and drives the wheel 28 and shaft 15. Gears 26 and 27 function as a secondary speed-reduction of the unit. Gear 27 is concentric with the in-put shaft 13 and the out-put shaft 15. In the construction of the secondary reduction illustrated in Figs. 1 and 2, in which the externally-toothed gear is epicycloidal and drives an internally-toothed out-put gear, the ratio is a multiplication of the ratio of the gear 24 to the gear 23 and the ratio of the gear 26 to the out-put gear 27.

In Fig. 5 the invention is exemplified in speed-reducing gearing in which the ring 19ª of the primary reduction is provided with an internally-toothed gear 26ª which meshes with and has its pitch-circle concentric with gear 24 on said ring and with eccentric 18. In this modification the ratio between gears 26, 27 is a differential of the ratio between the eccentric gear 24 to the stationary gear 23 and the internal gear 26ª to the out-put gear 28ª. Except for the difference in construction in the secondary gearing, the unit is the same in construction as that illustrated in Figs. 1 and 2 and the description of Figs. 1 and 2 is applicable to both forms of the invention.

Figs. 3 and 4 illustrate the operation of the gears of the primary reduction embodied in the constructions of Figs. 1, 2 and 5, according to the relative dimensions and contours of a commercial unit, by which the objects and advantages of the invention are attained. This specific construction is of a unit in which the stationary internally-toothed gear 23 has eighty-one teeth of ten diametral pitch and a pitch-diameter of 8.140" indicated at $a^1$; the epicycloidal gear 24 journaled on eccentric 18 has eighty teeth of ten diametral pitch and a pitch-diameter indicated at $b^1$ of 8.000"; the side-faces $a$ of the teeth on gear 24 and the side-faces $b^1$ of the teeth of gear 23 are substantially straight and have a pitch-angle of 37°; the teeth of both gears have an addendum of .070" and a dedendum of .090"; the ends $a^1$ of the teeth of gear 24 and the ends $b^1$ of the teeth of gear 23 are rounded, as at $a^2$, $b^2$, respectively, on a radius not less than one-half of the theoretical addendum; and the throw of the eccentric is .140" which is equal to the difference in the pitch-diameters of the gears. A slight clearance is necessary and is provided between the teeth of gears 23, 24, for the fulcruming of gear 24 on the teeth of gear 23 during the rotation of the eccentric. The throw of the eccentric is sufficient, but not substantially more than is necessary, to permit the outer curved ends $b^2$ of gear 24 to move across the curved ends $a^2$ of the teeth of gear 23 at the point of their maximum radial inward movement by the eccentric and diametrically opposite to the point of maximum interfitting of the teeth of said gears at the limit of the outward movement of gear 24 by the eccentric. Each revolution of the eccentric imparts an epicycloidal movement of gear 24 due to the engagement of the latter with stationary gear 23 and rotates gear 24 a distance equal to the pitch of the teeth of gear 24 or a sufficient distance to engage the succeeding tooth of gear 24. The rounded ends of the gear-teeth of both gears 23, 24 are provided to reduce the radial travel necessary for clearance between the teeth in the epicycloidal movement of gear 24 and, with very slight clearance between the engaging teeth, permit the fulcruming of the gear 24 on the teeth of the gear 23 for the lever movement imparted to the epicycloidal gear by the eccentric.

Fig. 4 illustrates, on an enlarged scale, the path of travel of a single tooth of the epicycloidal gear 24 relatively to the teeth of the stationary gear 23 at points 36° apart during one revolution of the eccentric. The path of the center of the tip of a tooth of gear 24 is indicated by the line $b^4$. The profiles of the teeth of gears 23, 24 are illustrated on an enlarged scale in Fig. 6. From Figs. 3 and 4, it will be seen that the tooth-path of the epicycloidal gear, with the throw of the eccentric, the tooth-profile, and pitch-circles of the gears described, result in bringing the side-faces $a$ of the teeth of gear 24 and the side-faces $b$ of gear 23 parallel-wise into successive pressure engagement, maintain whole or partial simultaneous engagement of a large number of teeth on the gears at all times, utilize the minimum eccentric throw and radial movement of the epicycloidal gear, and cause the teeth of gear 24 to move to and from the teeth of gear 23 with minimum sliding engagement.

In traversing the path indicated by the line $b^4$ in Fig. 4, the side-faces $b$ of the teeth of gear 24 and the side-faces $a$ of gears 23 become parallel immediately before the faces $b$ pass into pressure engagement with the faces $a$ and remain parallel during the initial movement of the faces $b$ out of such engagment. This results from the travel of the eccentric across the diametrical line intersecting the center of the engaging tooth of gear 24 and the axis of rotation of the eccentric.

The coacting faces $a$, $b$ of the teeth of gears 23 being straight and parallel during engagement, result in distributing the pressure or load throughout the entire area of the side-faces, as contradistinguished from a line engagement in gears of standard tooth-profile. The 37° pitch angle of the teeth and the short stroke of the eccentric make possible parallel engagement of tooth-faces and produce lines of action which do not impose heavy loads on the bearings between the eccentric and ring 19. The lines of action are substantially perpendicular to the engaging toothed-faces and approach tangency to the pitch-circles of the gears of the secondary reduction.

Approximately one-sixth of the entire number of teeth in gears 23, 24 are either wholly or partially engaged at all times. In consequence of this, the load is correspondingly distributed throughout approximately one-sixth of the gear-teeth, in lieu of being concentrated on a single pair of engaging teeth, as occurs when the gears are provided with teeth of standard profile.

The teeth of gears 26 and 27 of the secondary reduction in Fig. 1 and the teeth 26ª, 27ª of the secondary reduction in Fig. 5, are of the same order as those described in connection with the gears 23 and 24 so that the same operative results with respect to efficiency will be attained in the secondary reduction.

In practice, it has been found that the highest efficiency is attained in gearing embodying the invention in which there is a difference of but one tooth in the number of teeth in the fixed and epicycloidal gears, but in some instances an advantage in efficiency can be attained in constructions in which the difference is not greater than three. It has also been found in practice that in this gearing a pitch-angle of 37° in the teeth in the gears is the optimum and is highly efficient and that in some instances the efficiency can be improved if the pitch-angle of the teeth is kept between 35° and 41°.

The invention exemplifies helio-centric speed-reducing gearing, which is of high efficiency in operation, and makes it possible to utilize gearing of this type in a comparatively small unit for high ratio speed-reduction of high capacity and in a wide range of variation in speeds by variation in the secondary reduction.

The invention is not to be understood as restricted to the details set forth, since these may be modified within the scope of the appended claims, without departing from the spirit and scope of the invention.

Having thus described the invention, what I regard as new and desire to secure by Letters Patent is:

1. Speed-reducing gearing comprising a driven shaft, an eccentric on, and rotatable with, said shaft; a stationary internally toothed gear, a planetary externally toothed driving gear meshing with the stationary gear journaled on, and driven by the eccentric, the teeth of both of said gears having rounded ends, V-shaped profiles, straight side faces, and rounded apices, the throw of the eccentric and the pitch angle of the teeth being co-related so that the path of the teeth on the externally toothed gear will be substantially radially inward from full meshing position during their initial withdrawal from the teeth of the stationary gear, then in an arc of a predetermined diameter during their further withdrawal, then circumferentially on an arc of greater diameter approximating a straight path around the apices of the teeth of the stationary gear, then successively on a reverse arc of said predetermined diameter, and then substantially radially outward into engagement with the teeth of the stationary gear to bring the teeth of the gears into engagement, the contiguous straight side faces of the teeth on the gears being parallel in their fully meshing position, the radial portions of said path effecting the meshing of the teeth so substantially the entire area of the contiguous side faces will pass into substantially parallel pressure engagement.

2. Speed-reducing gearing comprising a driven shaft, an eccentric on, and rotatable with, said shaft, a stationary internally toothed gear, a planetary externally toothed driving gear meshing with the stationary gear, journaled on, and driven by, the eccentric, the teeth of said gears having rounded ends, V-shaped profiles, straight side faces and rounded apices, the throw of the eccentric and the pitch angle of the teeth being co-related so that the path of the teeth on the externally toothed gear will be substantialy radially inward from full meshing position during their initial withdrawal from the teeth of the stationary gear, then in an arc of a predetermined diameter during their further withdrawal and then circumferentially on an arc of greater diameter approximating a straight path around the apices of the teeth of the stationary gear, then successively on a reverse arc of said predetermined diameter and then substantially radially outward into engagement with the teeth of the stationary gear to bring the side faces of the teeth of the gears into engagement, the side faces of the contiguous teeth being parallel and engaged throughout substantially their entire straight areas in their fully meshing position, the radial portions of said path effecting the meshing and unmeshing of the teeth so their side faces will pass into parallel pressure engagement without substantial rubbing action.

3. Speed-reducing gearing comprising a driven shaft, an eccentric on, and rotatable with, said shaft, a stationary internally toothed gear, a planetary externally toothed driving gear meshing with the stationary gear, journaled on, and driven by the eccentric, the teeth of said gears having rounded ends, V-shaped profiles, straight side faces and rounded apices, the throw of the eccentric and the pitch angle of the teeth being co-related so that the path of the teeth on the externally toothed gear will be substantially radially inward from full meshing position during their initial withdrawal from the teeth of the stationary gear, then in an arc of a predetermined diameter during their further withdrawal, then circumferentially on an arc of greater diameter approximating a straight path around the apices of the teeth of the stationary gear, then successively on a reverse arc of said predetermined diameter, and then substantially radially outward into engagement with the teeth of the stationary gear to bring the teeth of the gears into engagement, the contiguous side faces of the teeth on the gears being parallel and engaged throughout substantially their entire straight area in their fully meshing position, the radial portions of said path effecting the meshing and unmeshing of the teeth so their side faces will pass into substantially parallel pressure engagement, the throw of the eccentric being adapted to produce the circumferential portion of said tooth-path with only slight clearance around the teeth of the stationary gear.

BRADFORD FOOTE, Jr.